Figure 1:
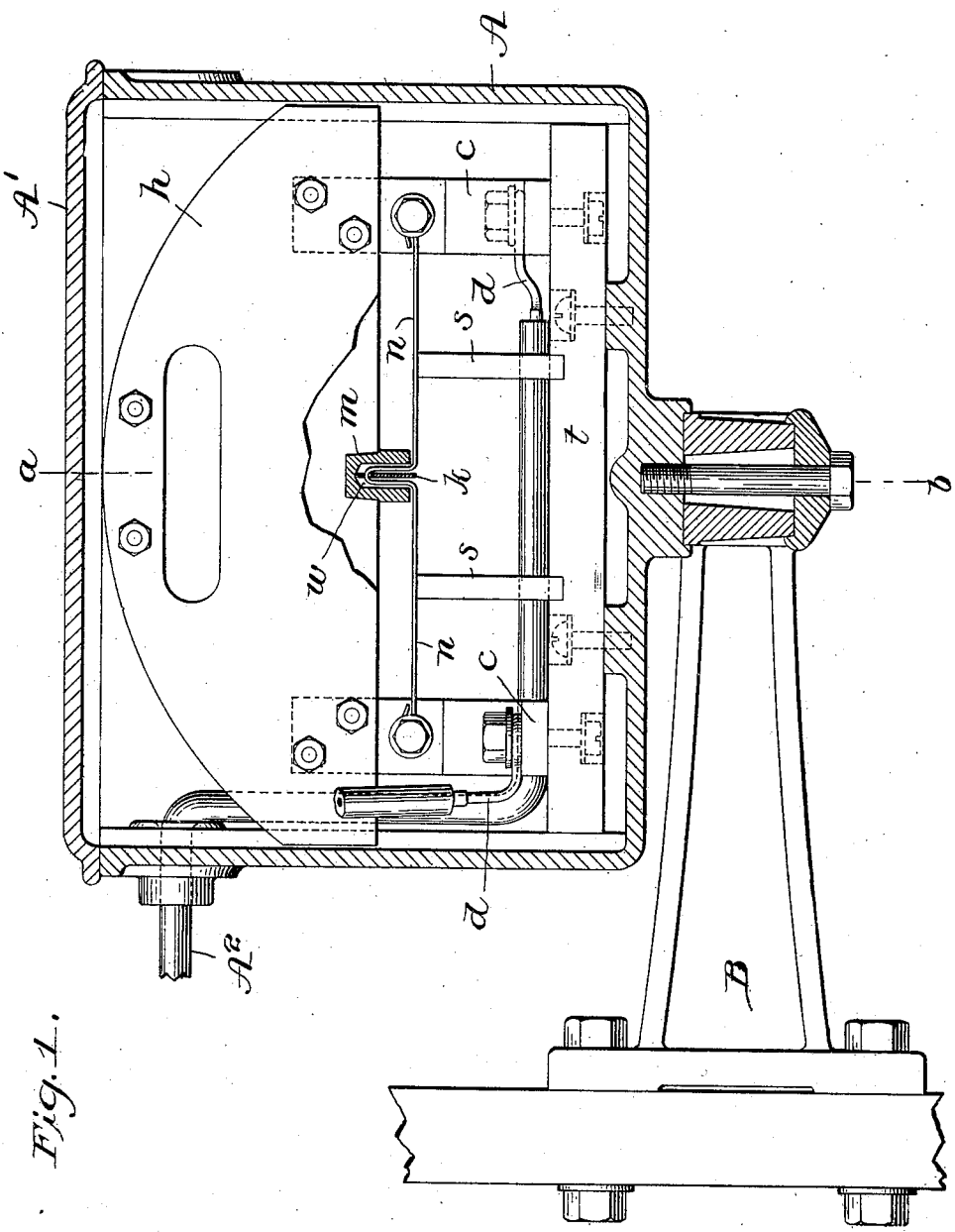

No. 654,187. Patented July 24, 1900.
A. L. STEVENS.
ELECTRICAL SAFETY FUSE.
(Application filed Aug. 16, 1899.)

(No Model.) 2 Sheets—Sheet 1.

Witnesses. Inventor.
A. V. Group Arthur L. Stevens
C. E. Parker By H. N. Low
 Attorney.

No. 654,187. Patented July 24, 1900.
A. L. STEVENS.
ELECTRICAL SAFETY FUSE.
(Application filed Aug. 16, 1899.)
(No Model.) 2 Sheets—Sheet 2.
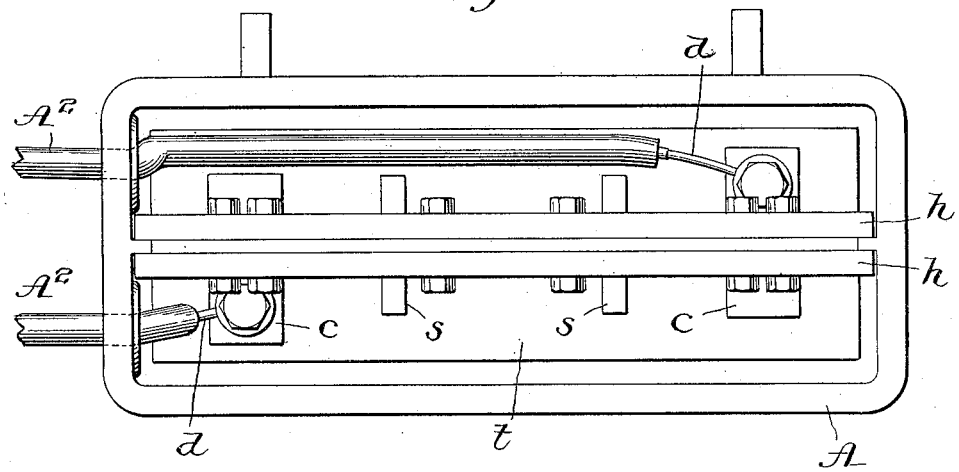
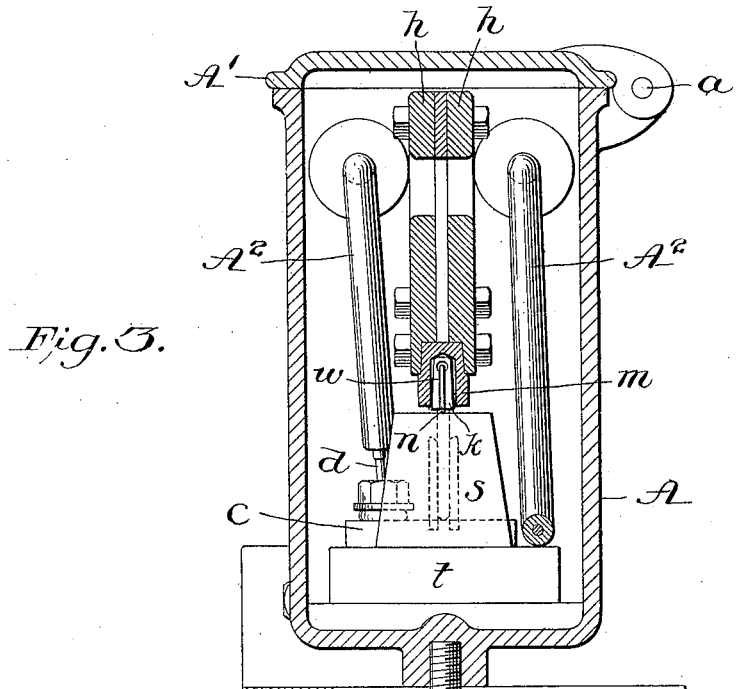
Witnesses. Inventor.
Arthur L. Stevens
Attorney.

UNITED STATES PATENT OFFICE.

ARTHUR L. STEVENS, OF NEW YORK, N. Y., ASSIGNOR TO THE PENNSYLVANIA MANUFACTURING, LIGHT AND POWER COMPANY, OF NEW JERSEY.

ELECTRICAL SAFETY-FUSE.

SPECIFICATION forming part of Letters Patent No. 654,187, dated July 24, 1900.

Application filed August 16, 1899. Serial No. 727,465. (No model.)

*To all whom it may concern:*

Be it known that I, ARTHUR L. STEVENS, a citizen of the United States, residing at the city of New York, State of New York, have invented certain new and useful Improvements in Electrical Safety-Fuses, of which the following is a full, clear, and exact description, reference being had to the accompanying drawings, forming a part of this specification.

My invention relates to electrical safety-fuses, having for its object to afford protection to lines of wire carrying electrical currents for light, power, or other purposes when the current by accident or otherwise becomes increased above the safe carrying capacity of the wire or conductor, the fuse breaking or opening the circuit at that point, as do all electrical fuses for like purposes.

To that end my invention consists in supplying a fuse-wire of any usual character, insulating a section thereof, and submerging the remainder in oil contained in any suitable receptacle; also, in providing within said receptacle an insulation of the fuse where the current is to be broken by means of an air-chamber; also, as a modified form by insulating such portion of the fuse on either side of a central non-insulated portion by means of any usual insulating or non-conducting material, and also in mechanical devices for mounting and arranging in circuit said fuse-wires and portions or sections of the conducting-wires on either side of the fuse.

In the drawings illustrating my invention, Figure 1 is a side elevation, partly in section, showing the fuse, its oil-receptacle, means for forming an air-chamber around the fuse, and the box and mechanical devices for mounting and arranging the same and the conducting-wires. Fig. 2 is a plan view of the same with the lid or cover of the box removed, and Fig. 3 is a section through the line *a b* of Fig. 1.

In the drawings, A represents the fuse-box, supported by the bracket B, said box having a lid or cover A', hinged at *a*, Fig. 3. Apertures in the walls of the box admit insulating-tubes $A^2$ $A^2$ for the conducting-wires *d d*, which are fastened in the box upon suitable terminal blocks *c c*, upon which also rest two narrow insulating-blocks *h h*, clamped together (see Fig. 3) and employed for the purpose of supporting between their lower ends a chambered or recessed fuse-block *m*. In Fig. 1 one of these narrow insulating-blocks *h* is shown partly broken away to show in section the recessed fuse-block *m*, clamped between their lower ends. The fuse is represented at *n*, resting upon blocks *s s*, which in turn are supported from the block-base *t* on the floor of the box A. The fuse-wire *n*, as usual, connects the ends of the conducting-wires in the two terminal blocks *c c*.

A wedge *k* is driven into the recessed or chambered fuse-block *m* in such manner as to be maintained within said recess and not fill the same, but leave an air-space *w* at or near the top thereof, and the fuse-wire *n* is strung through a hole in said wedge near the top thereof and passing down and out through the open side of said recessed block *m* and thence to the conductor-terminals *c c*. The lower portion of the box A is then filled with oil, preferably a mineral oil, so that the fuse-wire *n* may be submerged therein.

In lieu of the air-space *w* in the fuse-block around the wedge the same may be filled with a non-conducting substance covering that short portion of the fuse-wire within said block.

The operation of the device is as follows: The line is enabled to work at higher pressures than usual with ordinary safety-fuses. When the fuse is ruptured or burned out, the arc which is formed will be immediately extinguished by the action of the surrounding oil, which will also furnish a perfect insulation for the terminals *c c*, which are submerged therein. It is to be noted that the hinged cover A' is not to be fastened tightly to the box A, but is provided merely to keep out air and dust, as it must be free to rise to allow for discharge of gases when the fuse is blown or burned out.

In working the line at high pressure when the fuse is blown and the circuit is opened there is danger of the arc being maintained, due to the metallic vapors which are formed not only by the burned fuse-wire, but also by the arc fusing the conducting-terminals *c c*. By submerging the same, and particularly the fuse itself, in oil this possible danger is entirely prevented. The electrical carrying capacity of the fuse-wire is, however, largely increased by the oil, due to the heat generated in the wire being rapidly taken up by the oil and radiated from the walls of the box, making the fuse unreliable for rapid action and preventing accurate calibration. This, however, is overcome by insulating a section of the fuse-wire, which may be effected by the provision of the air-chamber $w$, formed in the recessed block $m$ around the wedge $k$, which air-chamber operates as an insulating medium for that portion of the fuse-wire passing through it, or, as before stated, such section of the fuse-wire may be wrapped or embedded in asbestos or other non-conducting material placed in said air-chamber $w$ or elsewhere within the recessed block $m$.

Having thus described my invention, what I claim as new, and desire to secure by Letters Patent, is—

1. The combination with a containing vessel, having means for the insulated entrance therein of a pair of conducting-wires, terminal blocks in said vessel connecting the conducting-wires and the opposite ends of an electrical safety-fuse wire, a volume of oil maintained in said vessel to submerge the terminals and the greater portion of the fuse-wire, a fuse-block $m$ recessed to form a chamber, a pair of insulating clamping-blocks $h$ $h$ supporting the same, and a perforated wedge partly filling the recess in the fuse-block, said recessed block and wedge operating to maintain a section of the fuse-wire insulated and free from the surrounding oil; substantially as and for the purposes set forth.

2. The combination with a suitable containing vessel, of terminal blocks, a pair of insulated conducting-wires leading thereto, a safety-fuse wire, a volume of oil submerging said terminals and the greater portion of said safety-fuse, and an insulating medium surrounding a section of said safety-fuse and maintained free from contact with the oil; substantially as described.

3. The combination with a suitable containing vessel, of terminal blocks for a pair of conducting-wires and an electrical safety-fuse wire, of a recessed block containing an air-chamber, a section of the fuse being held within said air-chamber, means adapted to seal the opening to said chamber while permitting the fuse-wire to pass out of the same and a volume of oil within said containing vessel submerging the conducting-terminals and all of the safety-fuse except the portion thereof within said air-chamber; substantially as and for the purposes set forth.

4. In combination, the box or vessel A, having hinged lid A', terminal blocks therein, insulated conducting-wires leading to said blocks, and a safety-fuse wire between the latter, a closed chamber in which a section of said fuse-wire is contained, a volume of oil submerging said conducting-wires and safety-fuse except the portion of the latter within the closed chamber, means to support said vessel A, and means to clamp and support said closed chamber within the containing vessel; substantially as described.

In testimony whereof I have hereunto affixed my signature this 4th day of August, A. D. 1899.

ARTHUR L. STEVENS.

Witnesses:
WALTER C. PUSEY,
H. T. FENTON.